(12) United States Patent
Uemura

(10) Patent No.: US 12,436,447 B2
(45) Date of Patent: Oct. 7, 2025

(54) LENS BARREL HAVING EXCELLENT ASSEMBLABILITY IN ASSEMBLY OF OPTICAL LENS AND OTHER MEMBERS THEREOF, AND HAVING GOOD OPTICAL PERFORMANCE, IMAGE PICKUP APPARATUS INCLUDING THE SAME, AND METHOD FOR POSITIONING OPTICAL LENS

(71) Applicant: CANON KABUSHIKI KAISHA, Tokyo (JP)

(72) Inventor: Kohei Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 18/357,310

(22) Filed: Jul. 24, 2023

(65) Prior Publication Data
US 2024/0036440 A1    Feb. 1, 2024

(30) Foreign Application Priority Data
Jul. 28, 2022 (JP) ................................. 2022-120683

(51) Int. Cl.
*G03B 17/14* (2021.01)
(52) U.S. Cl.
CPC ................................... *G03B 17/14* (2013.01)
(58) Field of Classification Search
CPC ............................. G03B 17/14; G02B 27/646
See application file for complete search history.

(56) References Cited

U.S. PATENT DOCUMENTS

| | | | |
|---|---|---|---|
| 2014/0169777 A1* | 6/2014 | Ishimasa | G02B 27/646 359/557 |
| 2018/0231734 A1* | 8/2018 | Ochi | G02B 7/021 |
| 2023/0176450 A1* | 6/2023 | Meng | G03B 17/14 396/544 |

FOREIGN PATENT DOCUMENTS

| | | |
|---|---|---|
| JP | 05-188253 A | 7/1993 |
| JP | 2020-086447 A | 6/2020 |

* cited by examiner

*Primary Examiner* — James A Dudek
(74) *Attorney, Agent, or Firm* — Cowan, Liebowitz & Latman, P.C.

(57) ABSTRACT

A lens barrel having excellent assemblability in the assembly of components thereof and having good optical performance. The lens barrel comprises an optical lens including a lens unit which has a flange on an outer peripheral thereof, a retaining member retaining the optical lens on one side of the lens unit in an optical axis direction, and a pressing member, which is positioned and fixed at a position in a direction perpendicular to the optical axis direction, and biases and presses the optical lens toward one side in the optical axis direction, wherein a positioning unit positions the optical lens relative to the pressing member, using at least one projection in the flange/pressing member, protrudes in the optical axis direction, and at least one recess in the pressing member/flange, into which the projection is inserted, wherein the projection/recess has a tilted surface contacting the recess/projection.

17 Claims, 11 Drawing Sheets

LENS BARREL HAVING EXCELLENT ASSEMBLABILITY IN ASSEMBLY OF OPTICAL LENS AND OTHER MEMBERS THEREOF, AND HAVING GOOD OPTICAL PERFORMANCE, IMAGE PICKUP APPARATUS INCLUDING THE SAME, AND METHOD FOR POSITIONING OPTICAL LENS

BACKGROUND OF THE INVENTION

Field of the Invention

The present invention relates to a lens barrel having excellent assemblability in the assembly of an optical lens and other members thereof, and having good optical performance, an image pickup apparatus including the same, and a method for positioning an optical lens.

Description of the Related Art

In recent years, there is a need for a lens barrel that achieves both a reduction in size and a reduction in production cost. In order to achieve these both reductions, aspheric lenses made from, for example, inexpensive plastic materials and having high optical performance tends to be adopted. In order to fix a plastic aspherical lens to a lens barrel, a gap is formed between the aspherical lens and the lens barrel, an adhesive is used for the fixing, or the like. Such fixing methods cause deterioration of optical performance because the aspherical lens slightly moves over time or due to environmental changes.

As a configuration for preventing the deterioration of optical performance, Japanese Laid-Open Patent Publication (kokai) No. H5-188253 discloses a plastic lens retention mechanism including a plastic lens, a lens barrel, and a pressing ring that presses the plastic lens against the lens barrel to retain the plastic lens. In the plastic lens retention mechanism disclosed in Japanese Laid-Open Patent Publication (kokai) No. H5-188253, the pressing ring has a tongue-shaped spring and the lens barrel has an indentation, wherein the plastic lens is fixed when the tongue-shaped spring is engaged with the indentation.

Japanese Laid-Open Patent Publication (kokai) No. 2020-86447 discloses a lens module including a lens and a cylindrical lens barrel having an inner peripheral portion where an outer peripheral portion of the lens is interlocked. In the lens module disclosed in Japanese Laid-Open Patent Publication (kokai) No. 2020-86447, the lens has a tapered rib and the lens barrel has a tapered indentation, wherein the lens is fixed when the tapered rib and the tapered indentation are interlocked with each other and the inner peripheral portion of the lens barrel and the outer peripheral portion of the lens are interlocked with each other.

However, in the plastic lens retention mechanism disclosed in Japanese Laid-Open Patent Publication (kokai) No. H5-188253, since the tongue-shaped spring is engaged with the indentation, the plastic lens may be displaced when a force larger than a spring force of the tongue-shaped spring is applied to the plastic lens. As a result, the optical performance is diminished. Furthermore, when the tongue-shaped spring is engaged with the indentation to assemble the pressing ring and the lens barrel, the pressing ring and the lens barrel are needed to be rotated in opposite directions relative to each other. However, for example, if an excessive force is applied during the rotation, the tongue-shaped spring may be damaged. From this point of view, this plastic lens retention mechanism is poor in assemblability.

In the lens module disclosed in Japanese Laid-Open Patent Publication (kokai) No. 2020-86447, since the lens is fixed by the tapered rib and the tapered indentation being interlocked with each other and the inner peripheral portion of the lens barrel and the outer peripheral portion of the lens being interlocked with each other, the lens may be deformed and become unstable. As a result, the optical performance is diminished. Furthermore, in such a lens fixing configuration, each component requires high dimensional accuracy and the assembly of the components require high assembly accuracy. From these points of view, the lens module is also poor in assemblability.

SUMMARY OF THE INVENTION

The present invention provides a lens barrel having excellent assemblability in the assembly of an optical lens, a retaining member, and a pressing member and having good optical performance, and also provides an image pickup apparatus and a method for positioning an optical lens.

Accordingly, the present invention provides a lens barrel comprising an optical lens including a lens unit configured to function as a lens and a flange disposed in an outer peripheral portion of the lens unit and having an enlarged outside diameter, a retaining member configured to retain the optical lens on one side of the lens unit in a direction of an optical axis, a pressing member which is positioned and fixed by the retaining member at a position in a perpendicular direction perpendicular to the direction of the optical axis, the pressing member being configured to bias and press the optical lens toward one side in the direction of the optical axis with respect to the retaining member, and a positioning unit configured to position the optical lens relative to the pressing member, wherein the positioning unit comprises at least one projection, which is disposed in one of the flange and the pressing member, and each of which protrudes in the direction of the optical axis, and at least one recess, which is disposed in the other of the flange and the pressing member, and each of which is opened toward the projection, and into which the projection is inserted, and wherein at least one of the projection and the recess has a tilted surface tilted relative to the direction of the optical axis and comes in contact with the other of the projection and the recess by the tilted surface.

According to the present invention, there is provided a lens barrel having excellent assemblability in the assembly of an optical lens, a retaining member, and a pressing member and having good optical performance.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. However, configurations described in the following embodiments are examples, and the scope of the present invention is not limited by the configurations described in the embodiments. For example, each part included in the present invention is replaceable with any configuration capable of exhibiting similar functions. In addition, any component may be added. Any two or more configurations (features) of the embodiments may be combined.

Figure 1:
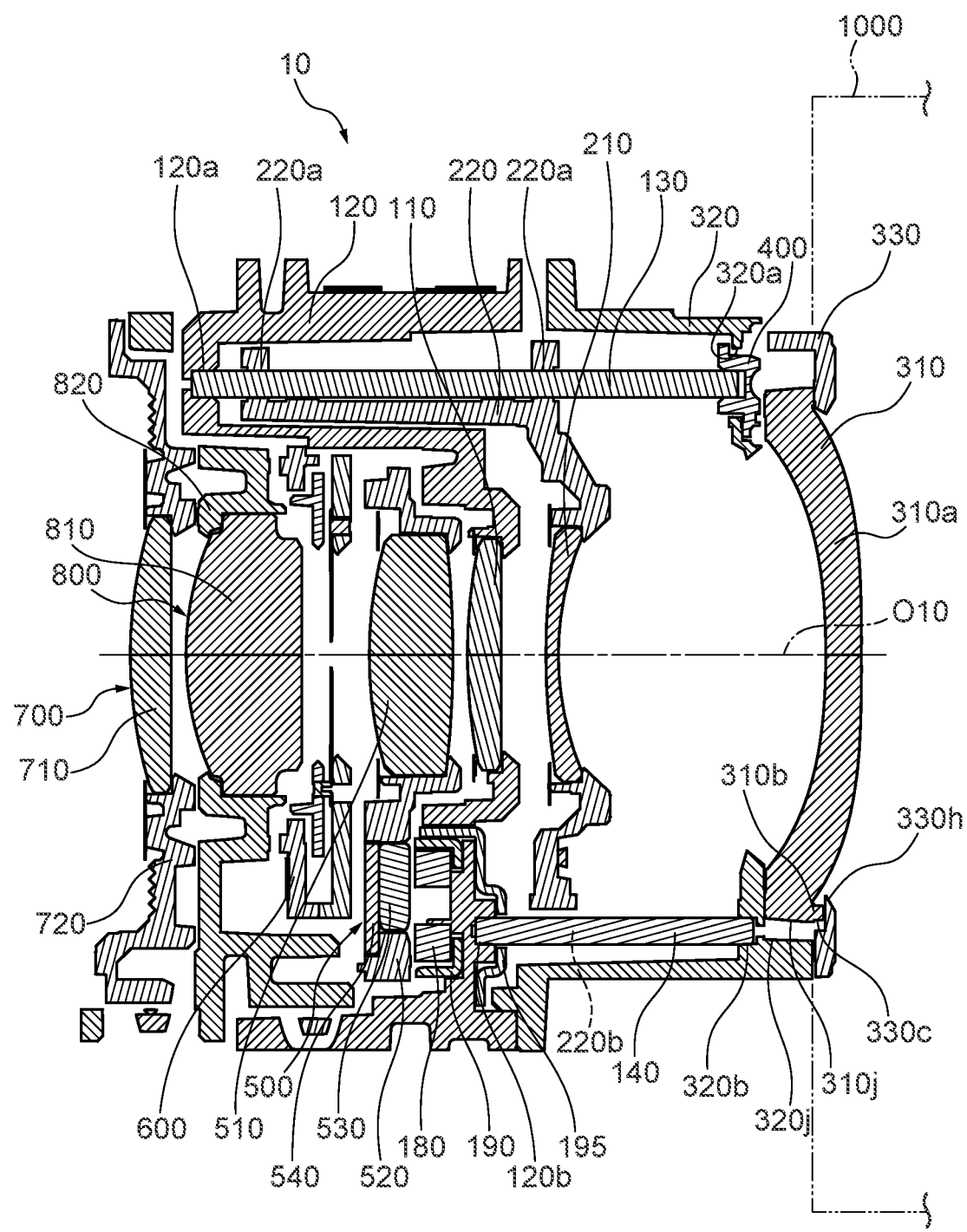
FIG. 1 is a longitudinal sectional diagram showing an internal structure of a lens barrel according to a first embodiment of the present invention.
Figure 2:
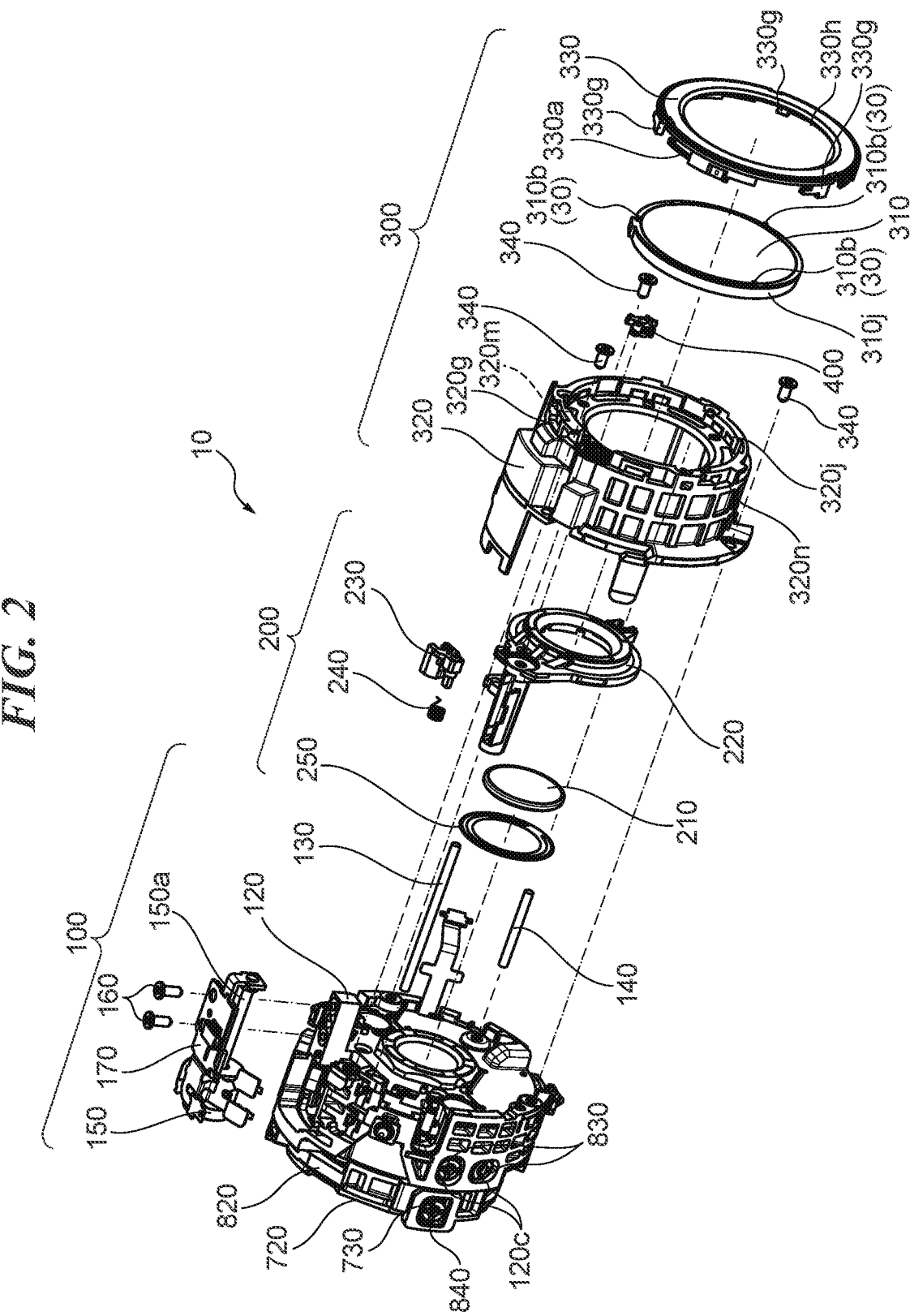
FIG. 2 is an exploded perspective diagram of the lens barrel shown in FIG. 1.

A first embodiment will now be described with reference to FIGS. 1 to 10. FIG. 1 is a longitudinal sectional diagram showing an internal structure of a lens barrel 10 according to the first embodiment of the present invention. FIG. 2 is an exploded perspective diagram of the lens barrel 10 shown in FIG. 1. The lens barrel 10 shown in FIG. 1 is attached to an image pickup apparatus 1000 when being used. It should be noted that the lens barrel 10 may be attachable to and detachable from the image pickup apparatus 1000 or may be fixed to the image pickup apparatus 1000 to restrain the attachment and detachment of the lens barrel 10. As shown in FIGS. 1 and 2, the lens barrel 10 includes a first fixed lens group 100, a focus group 200, a second fixed lens group 300, a shake reduction group 500, a diaphragm unit 600, a first adjusting lens group 700, and a second adjusting lens group 800.

The first fixed lens group 100 includes a first fixed lens 110, a first fixed lens frame (first retaining member) 120, a main guide bar 130, and a sub guide bar 140. It should be noted that the longitudinal sectional diagram of FIG. 1 shows the structure of the lens barrel 10 cut along a plane including the main guide bar 130 and the sub guide bar 140. The first fixed lens 110 is retained inside the cylindrical first fixed lens frame 120 in a concentric manner with the cylindrical first fixed lens frame 120. The first fixed lens frame 120 may not retain the first fixed lens 110 in a case where it is not necessary from an optical design viewpoint. Details of the main guide bar 130 and the sub guide bar 140 will be described later.

The first fixed lens group 100 includes a drive source 150, an FPC 170, a coil 180, a first magnetic shielding plate 190, and a second magnetic shielding plate 195. The first fixed lens frame 120 retains a pair of coils 180 and a pair of first magnetic shielding plates 190. The pair of coils 180 and the pair of first magnetic shielding plates 190 being in such retained state are arranged in the same phase as a pair of shake reduction magnets 530 and a pair of yokes 540 which are included in the shake reduction group 500 and retained by a shake reduction lens frame 520. The first fixed lens frame 120 also retains the second magnetic shielding plate 195 which is arranged so as to cover the first magnetic shielding plates 190.

As shown in FIG. 1, the first fixed lens frame 120 includes a main guide retainer 120a and a sub guide retainer 120b. One end of the main guide bar 130 on the side closer to an object (the object side) is inserted into the main guide retainer 120a, and the main guide bar 130 is retained by the main guide retainer 120a. One end of the sub guide bar 140 on the object side is inserted into the sub guide retainer 120b, and the sub guide bar 140 is retained by the sub guide retainer 120b. Furthermore, the first fixed lens frame 120 is provided with a ball bearing surface (not shown) that abuts on three balls (not shown) disposed at equiangular intervals around an optical axis O10 of the lens barrel 10 (a lens unit 310a). The first fixed lens frame 120 is also provided with a hook (not shown) with which one end of a thrust spring (not shown) is engaged.

As shown in FIG. 2, the first fixed lens frame 120 retains the second adjusting lens group 800 via a plurality of second adjusting rollers 830 on the object side. The second adjusting lens group 800 retains the first adjusting lens group 700 via a plurality of first adjusting rollers 730. The first adjusting lens group 700 includes a first adjusting lens 710, a first adjusting lens frame 720, the first adjusting rollers 730, and a first adjusting lens group screw (not shown). The second adjusting lens group 800 includes a second adjusting lens 810, a second adjusting lens frame 820, the second adjusting rollers 830, a first adjusting roller insertion portion 840, and a second adjusting lens group screw (not shown).

The outermost peripheral portion of each first adjusting roller 730 is eccentric to the center of the first adjusting lens group screw and is interlocked with the first adjusting roller insertion portion 840 of the second adjusting lens frame 820. The first adjusting rollers 730 are rotated to move the first adjusting lens 710 to a desired position relative to the second adjusting lens 810, thereby positioning the first adjusting lens 710. Similarly, the outermost peripheral portion of each second adjusting roller 830 is eccentric to the center of the second adjusting lens group screw and is interlocked with a second adjusting roller insertion portion 120c of the first fixed lens frame 120. The second adjusting rollers 830 are rotated to move the second adjusting lens 810 to a desired position relative to the first fixed lens frame 120, thereby positioning the second adjusting lens 810. Furthermore, a tilt and eccentricity of the first adjusting lens 710 relative to the optical axis O10 and a tilt and eccentricity of the second adjusting lens 810 relative to the optical axis O10 are adjusted, which provides the lens barrel 10 with good optical performance.

As shown in FIGS. 1 and 2, the second fixed lens group 300 includes a second fixed lens (optical lens) 310, a second fixed lens frame (retaining member) 320, a cover (pressing member) 330, a screw 340, and a bearing (second retaining member) 400. The second fixed lens 310 includes the lens unit 310a disposed in a central part of the second fixed lens 310 and serving as a lens, and a flange 310j disposed in an outer peripheral portion of the lens unit 310a and having an enlarged outside diameter. In addition, the flange 310j of the second fixed lens 310 has three projections (protrusions) 310b protruding toward the image side (the other side) in a direction of the optical axis O10. In the configuration shown in FIG. 2, the three projections 310b are arranged at regular intervals along a circumferential direction of the flange 310j, that is, at equiangular intervals around the optical axis O10. The projections 310b constitute a positioning unit that determines the position of the second fixed lens 310 relative to the cover 330 (a method for positioning the optical lens). It should be noted that the placement number of projections 310b is not limited to three. The placement number of projections 310b may be, for example, one, two, or four or more but is preferably three or more.

The second fixed lens frame 320 is formed by a cylindrical or ring-shaped member. Inside the second fixed lens frame 320, the second fixed lens 310 is retained from the object side (one side) in the direction of the optical axis O10. The second fixed lens frame 320 has an opening 320a into which the bearing 400 is inserted and a sub guide retainer 320b into which the other end of the sub guide bar 140 is inserted.

The cover 330 is disposed on the image side (the other side) in the direction of the optical axis O10 with respect to the second fixed lens 310. The cover 330 is formed by a cylindrical or ring-shaped member and has a plurality of arms (biasing portions) 330a disposed in an outer peripheral portion of the cover 330. These arms 330a are arranged at regular intervals along the circumferential direction of the cover 330. Each arm 330a protrudes in an arc shape along the circumferential direction of the cover 330 and has elasticity. Each arm 330a engages with an engagement portion 320m disposed in the second fixed lens frame 320. With this configuration, the second fixed lens 310 is biased toward the object side in the direction of the optical axis O10 and pressed against the second fixed lens frame 320.

Furthermore, the cover 330 is connected to the second fixed lens frame 320 by the engagement between each arm 330a and the engagement portion 320m. The cover 330 also includes fitting portions 330g interlocked with a plurality of outer peripheral fitting portions 320n disposed in an outer peripheral portion of the second fixed lens frame 320. The outer peripheral fitting portions 320n and the fitting portions 330g are arranged at equiangular intervals around the optical axis O10 and are interlocked with each other. By this interlocking, the cover 330 is fixed by the second fixed lens frame 320 while being positioned in a perpendicular direction that is perpendicular to the direction of the optical axis O10 (hereinafter simply referred to as "perpendicular direction").

As shown in FIGS. 1 and 2, the focus group 200 is disposed as a linear motion group between the first fixed lens group 100 and the second fixed lens group 300 in the direction of the optical axis O10. The focus group 200 includes a focusing lens 210, a focusing lens frame (lens holder) 220, a rack 230, a rack spring 240, and a mask 250. The focusing lens frame 220 includes a fitting portion 220a into which the main guide bar 130 is slidably inserted and which is interlocked with the main guide bar 130, and includes an anti-shake unit 220b engaged with the sub guide bar 140. The rack 230 is rotatably retained by the focusing lens frame 220.

The rack 230 is biased by a biasing force of the rack spring 240 toward a lead screw 150a disposed in an output shaft of the drive source 150. In a state in which the drive source 150 is energized via the FPC 170, the focus group 200 is guided by the main guide bar 130 and the sub guide bar 140 and moves to a predetermined position in the direction of the optical axis O10 by the lead screw 150a and the rack 230 meshing with each other. Accordingly, the optical system of the lens barrel 10 becomes focused on the object. An optical image focused on the object is formed on an imaging surface of an image pickup device (not shown) such as a CMOS sensor in the image pickup apparatus 1000 to which the lens barrel 10 is attached. The image pickup device photoelectrically converts the formed image into image data. It should be noted that the drive source 150 may be, for example, a stepping motor but is not limited thereto.

As shown in FIG. 1, the shake reduction group 500 includes a shake reduction lens 510, the shake reduction lens frame 520, the pair of shake reduction magnets 530, the pair of yokes 540, and a pair of position detecting magnets (not shown). The shake reduction lens 510, the pair of shake reduction magnets 530, the pair of yokes 540, and the pair of position detecting magnets are retained by the shake reduction lens frame 520. The pair of shake reduction magnets 530 is disposed on opposite sides of each other across the optical axis O10. The pair of yokes 540 is disposed on the object side in the direction of the optical axis O10, respectively facing the pair of shake reduction magnets 530. The pair of position detecting magnets is disposed on opposite sides of each other across the optical axis O10 and respectively facing the pair of shake reduction magnets 530.

It should be noted that although the shake reduction group 500 includes the position detecting magnets, the invention is not limited to this configuration. For example, depending on the configuration of the shake reduction group 500, the shake reduction magnets 530 may double as position detecting magnets. The shake reduction lens frame 520 is provided with a ball bearing surface (not shown) that abuts on the three balls and a hook (not shown) with which the other end of the thrust spring is engaged. The balls are retained between the ball bearing surface of the first fixed lens frame 120 and the ball bearing surface of the shake reduction lens frame 520 by a biasing force of the thrust spring. This configuration enables the three balls to rotate, which makes the shake reduction lens frame 520 movable in the perpendicular direction.

The diaphragm unit 600 is disposed on the object side of the shake reduction group 500 and is retained by the second fixed lens frame 320 with a screw (not shown).

Hereinafter described is a method for reducing image blurs in the lens barrel 10. As described above, the lens barrel 10 is provided with the pair of shake reduction magnets 530, the pair of coils 180, and the pair of first magnetic shielding plates 190, which are arranged in the same phase. The lens barrel 10 is also provided with a flexible substrate (not shown). On the flexible substrate, the position detecting magnets and a pair of Hall elements arranged in the same phase as the position detecting magnets are mounted. In a state in which the coils 180 are energized, the shake reduction group 500 moves in the perpendicular direction relative to the first fixed lens group 100 by the Lorentz force generated between the coils 180 and the shake reduction magnets 530.

The Hall elements detect magnetic forces of the position detecting magnets. A control unit (not shown) of the image pickup apparatus 1000 is configured to compute a position of the shake reduction group 500 relative to the first fixed lens group 100 based on the detection result by the Hall elements. Furthermore, the control unit of the image pickup apparatus 1000 controls a voltage applied to the coils 180 based on image blur information from a gyro sensor (not shown) provided in the lens barrel 10 or the image pickup apparatus 1000. With this control of the applied voltage, the shake reduction group 500 can be moved in a direction in which image blur reduction is possible in the perpendicular direction. Accordingly, even if vibration such as camera shake is generated at the time of shooting, it is possible to obtain a still image or a moving image in which the blurring of an object image is reduced.

It should be noted that a state in which the coils 180 are energized, magnetism is generated between the coil 180 and the shake reduction magnet 530. The first magnetic shielding plate 190 prevents an influence of the generated magnetism on the image pickup device (magnetic shielding effect). In addition, to further enhance the magnetic shielding effect, the second magnetic shielding plate 195 is disposed on the side of the first magnetic shielding plates 190 closer to the image pickup device. In the present embodiment, the second magnetic shielding plate 195 is configured to cover the pair of first magnetic shielding plates 190, in an integrated manner, but the present invention is not limited to this configuration. For example, the second magnetic shielding plate 195 may be divided into a plurality of parts and arranged according to the arrangement of the first magnetic shielding plates 190.

Figure 3A:
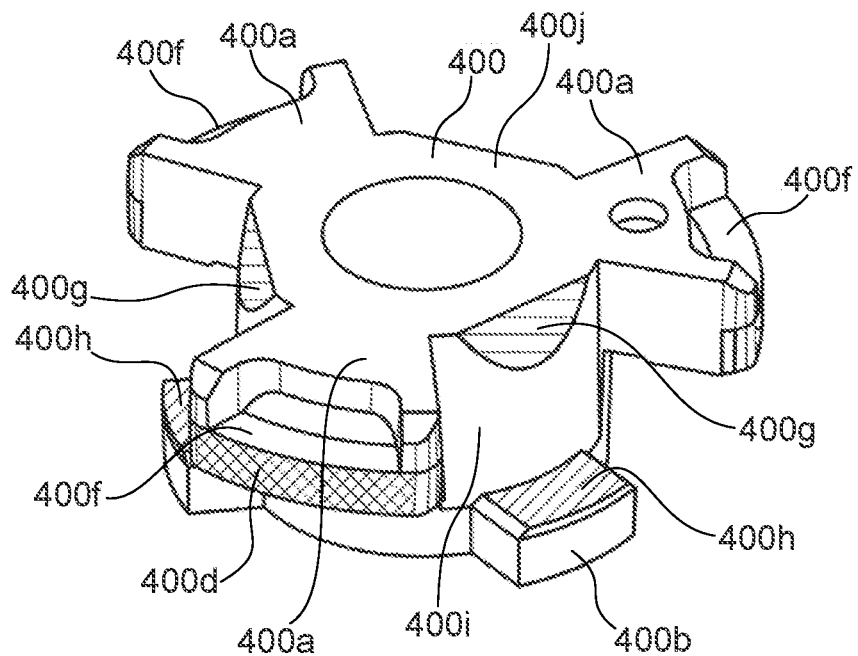
FIGS. 3A and 3B are perspective diagrams of a bearing included in the lens barrel shown in FIG. 1.
Figure 3B:
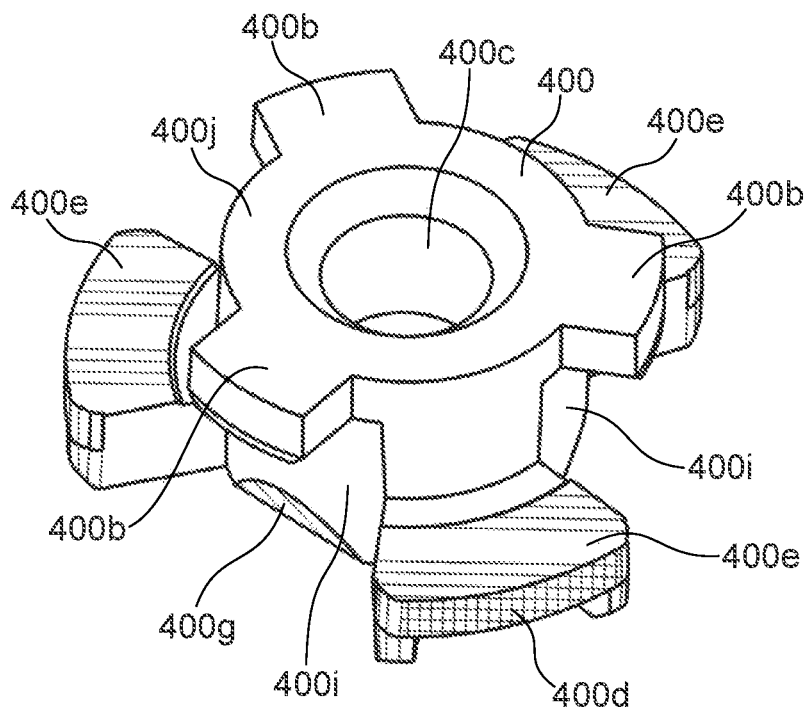
Figure 4A:
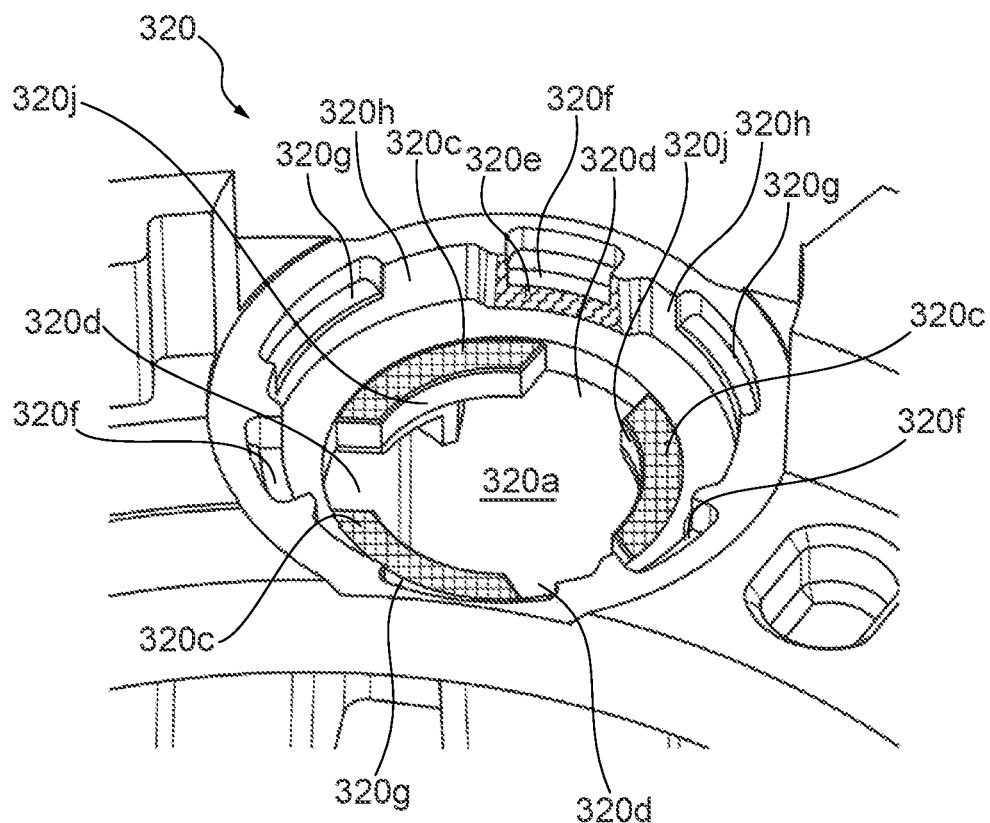
FIGS. 4A and 4B are partially enlarged perspective diagrams of a second fixed lens frame included in the lens barrel shown in FIG. 1.
Figure 4B:
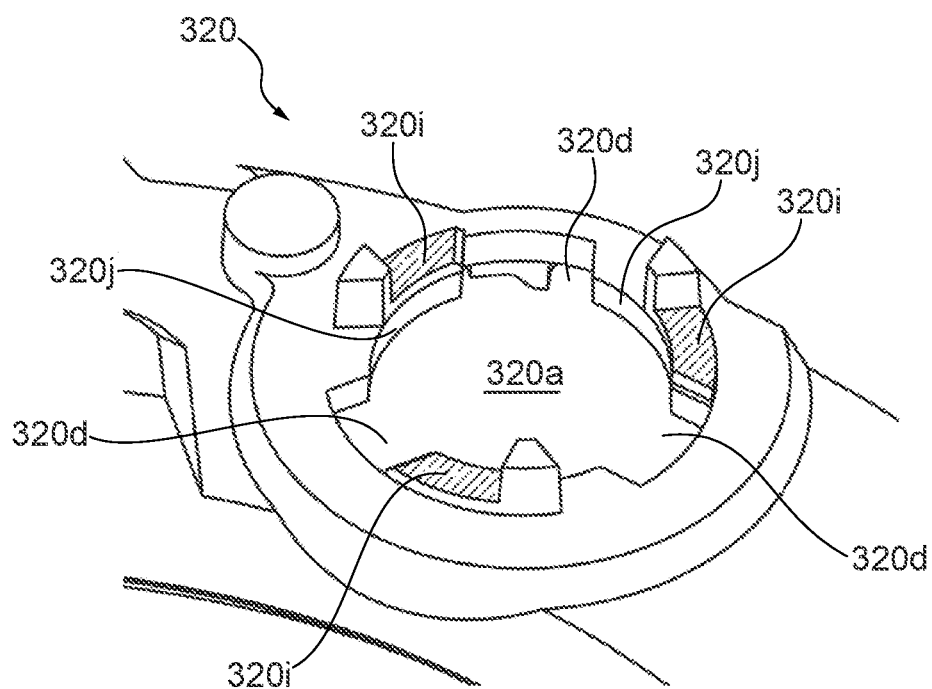

Next, a method for adjusting a tilt of the focus group 200 will be described. FIGS. 3A and 3B are perspective diagrams of the bearing 400 included in the lens barrel 10 shown in FIG. 1. FIGS. 3A and 3B show the bearing 400 from different directions. FIGS. 4A and 4B are partially enlarged perspective diagrams of the second fixed lens frame 320 included in the lens barrel 10 shown in FIG. 1. FIGS. 4A and 4B show the second fixed lens frame 320 from different directions.

As shown in FIGS. 3A and 3B, the bearing 400 includes a cylindrical main body 400*j*, a plurality of collars 400*a* formed on an outer peripheral portion 400*i* of the main body 400*j* in an integrated manner, and a plurality of protrusions 400*b* formed on the outer peripheral portion 400*i* of the main body 400*j*. The plurality of collars 400*a* are arranged at regular intervals along the circumferential direction of the main body 400*j* on one end of the main body 400*j*. Each collar 400*a* protrudes in the perpendicular direction. Although in the configuration shown in FIG. 3, three collars 400*a* are placed, the placement number of collars 400*a* is not limited to three. The plurality of protrusions 400*b* are arranged at regular intervals along the circumferential direction of the main body 400*j* on the other end of the main body 400*j*. Each protrusion 400*b* protrudes in the perpendicular direction. In the configuration shown in FIG. 3, the number of the protrusions 400*b* placed is the same as the number of the collars 400*a*, that is three protrusions 400*b* are placed, but the placement number of protrusions 400*b* is not limited to three. When viewed from the direction of the optical axis O10, the collars 400*a* and the protrusions 400*b* are disposed at positions not to overlap each other. A retainer 400*c* that retains the other end (image pickup side) of the main guide bar 130 is disposed on the side of the bearing 400 where the protrusions 400*b* are disposed.

Each collar 400*a* has an outermost peripheral portion provided with a fitting surface 400*d* curved in an arc shape centering on a central axis of the main body 400*j*. On the side closer to the protrusions 400*b*, each collar 400*a* has an abutting surface 400*e* which abuts on an abutting surface 320*c* (see FIG. 4A) of the second fixed lens frame 320. Each abutting surface 320*c* and each abutting surface 400*e* are planes parallel to the perpendicular direction. On the opposite side to the abutting surfaces 400*e* in each collar 400*a*, an indentation (hereinafter referred to as "adhesion indentation 400*f*") used for adhesion to the second fixed lens frame 320 is provided along the peripheral portion of the collar 400*a*.

The main body 400*j* is, between the adjacent collars 400*a*, provided with a jig facing surface 400*g* on which a jig 20 (see FIG. 7) used for adjusting a tilt of the focus group 200 abuts. Each jig facing surface 400*g* is a plane tilted relative to the central axis of the main body 400*j*. Each protrusion 400*b* is provided in the same phase as each jig facing surface 400*g*. Although the protrusions 400*b* and the jig facing surfaces 400*g* are in the same phase, the present invention is not limited to this configuration. Each protrusion 400*b* has a restricting surface 400*h*, on the side closer to the collars 400*a*. Each restricting surface 400*h* is a plane parallel to the perpendicular direction.

As shown in FIGS. 4A and 4B, the second fixed lens frame 320 includes the abutting surfaces 320*c* that abut on the abutting surfaces 400*e* of the bearing 400 and cutouts 320*d* into which the protrusions 400*b* of the bearing 400 are inserted. The second fixed lens frame 320 includes a plurality of fitting surfaces 320*e* facing the opening 320*a*, and inner walls 320*h* disposed between adjacent fitting surfaces 320*e*. Both the fitting surfaces 320*e* and the inner walls 320*h* are curved in an arc shape centering on the central axis of the opening 320*a*. The second fixed lens frame 320 includes first adhesion portions 320*f* provided in the same phase as the fitting surfaces 320*e* and second adhesion portions 320*g* provided in the same phase as the inner walls 320*h*. The second fixed lens frame 320 has restricting surfaces 320*i* disposed on the back side of the abutting surfaces 320*c*. The restricting surfaces 320*i* are planes parallel to the perpendicular direction.

To assemble the bearing 400 and the second fixed lens frame 320 having such a configuration, first, one end of the main guide bar 130 on the object side is inserted into the main guide retainer 120*a* of the first fixed lens frame 120. Along with this insertion, one end of the sub guide bar 140 on the object side is inserted into the sub guide retainer 120*b*. For this assembly, the main guide bar 130 is inserted in advance into the fitting portion 220*a* of the focusing lens frame 220 where the focusing lens 210, the rack 230, the rack spring 240, and the mask 250 are embedded. Accordingly, the focus group 200 is embedded in the first fixed lens group 100.

Next, the drive source 150 and the FPC 170 are assembled from the side surface of the second fixed lens frame 320 in such a manner that the rack 230 and the lead screw 150*a* mesh with each other, and are fixed to the second fixed lens frame 320 with a screw 160. The other end of the sub guide bar 140 on the image side is inserted into the sub guide retainer 320*b* of the second fixed lens frame 320, and the second fixed lens frame 320 is embedded in the first fixed lens group 100. In this state, the second fixed lens frame 320 is fixed to the first fixed lens frame 120 by a plurality of screws 340. After that, the bearing 400 is embedded in the opening 320*a* from the side closer to the cover 330 while the protrusions 400*b* of the bearing 400 and the cutouts 320*d* of the second fixed lens frame 320 being in the same phase.

Through these processes, the bearing 400 and the second fixed lens frame 320 are assembled, thereby afterward enabling a tilt adjustment of the focus group 200 as described later. When viewed from the direction of the optical axis O10, a part of the bearing 400 overlaps the second fixed lens 310, which makes it possible to achieve downsizing of the lens barrel 10 as much as the overlap.

Figure 5A:
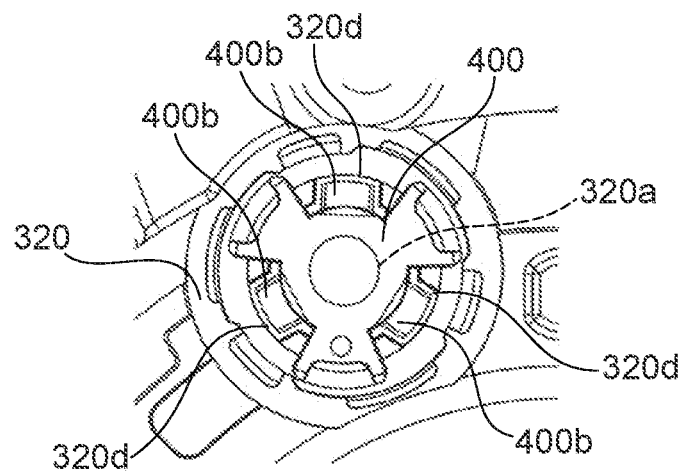
FIGS. 5A to 5C are plan diagrams showing a positional relation between the second fixed lens frame and the bearing viewed from a direction of an optical axis.
Figure 5B:
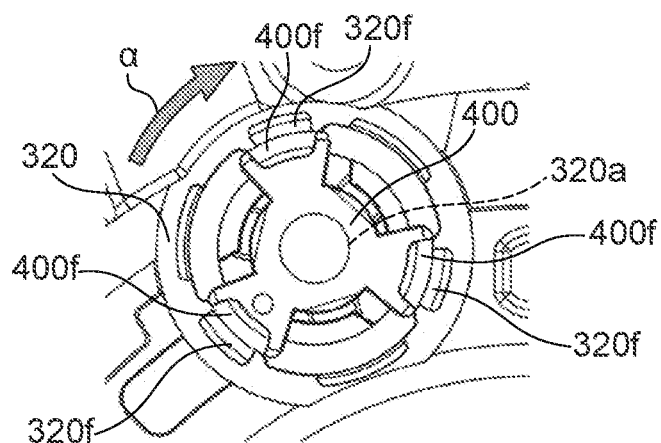
Figure 5C:
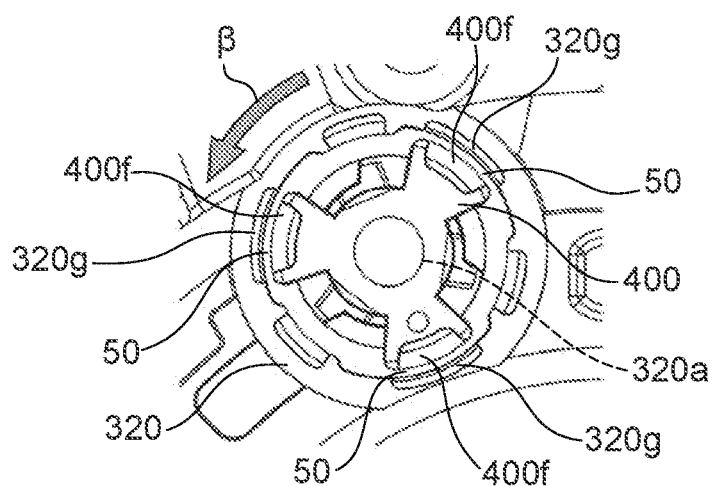

FIGS. 5A to 5C are plan diagrams showing a positional relation between the second fixed lens frame 310 and the bearing 400 viewed from the direction of the optical axis.

Figure 6A:
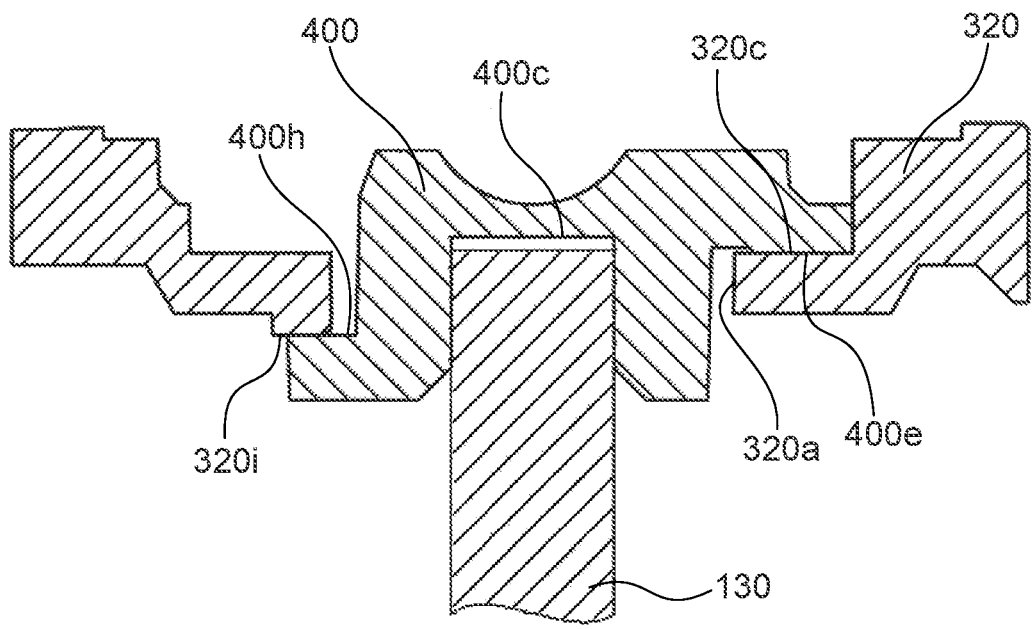
FIGS. 6A and 6B are longitudinal sectional diagrams showing a state in which the bearing is embedded in the second fixed lens frame.
Figure 6B:
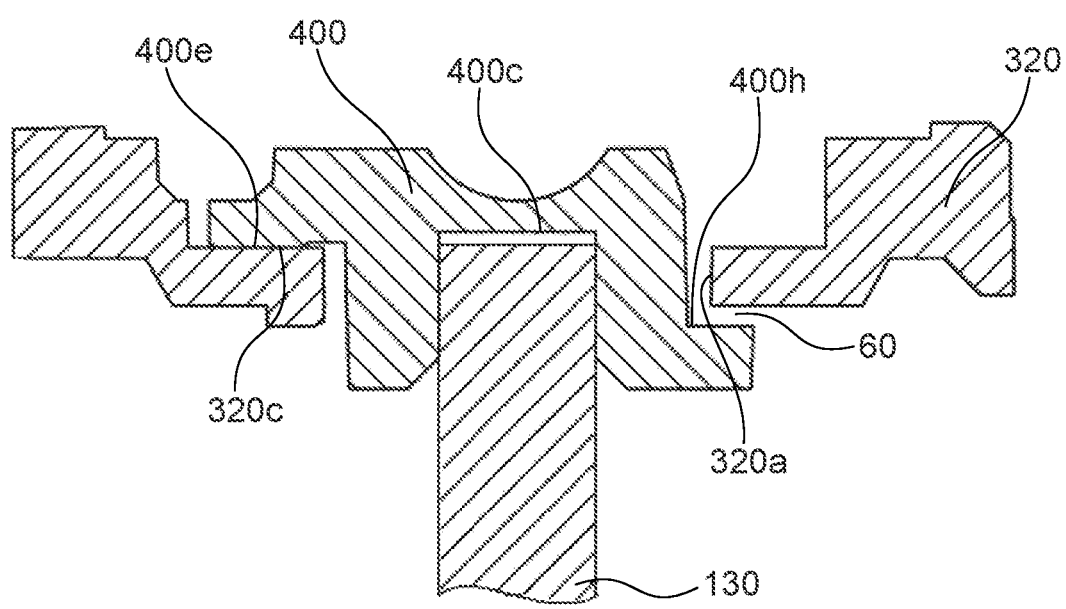
Figure 7:
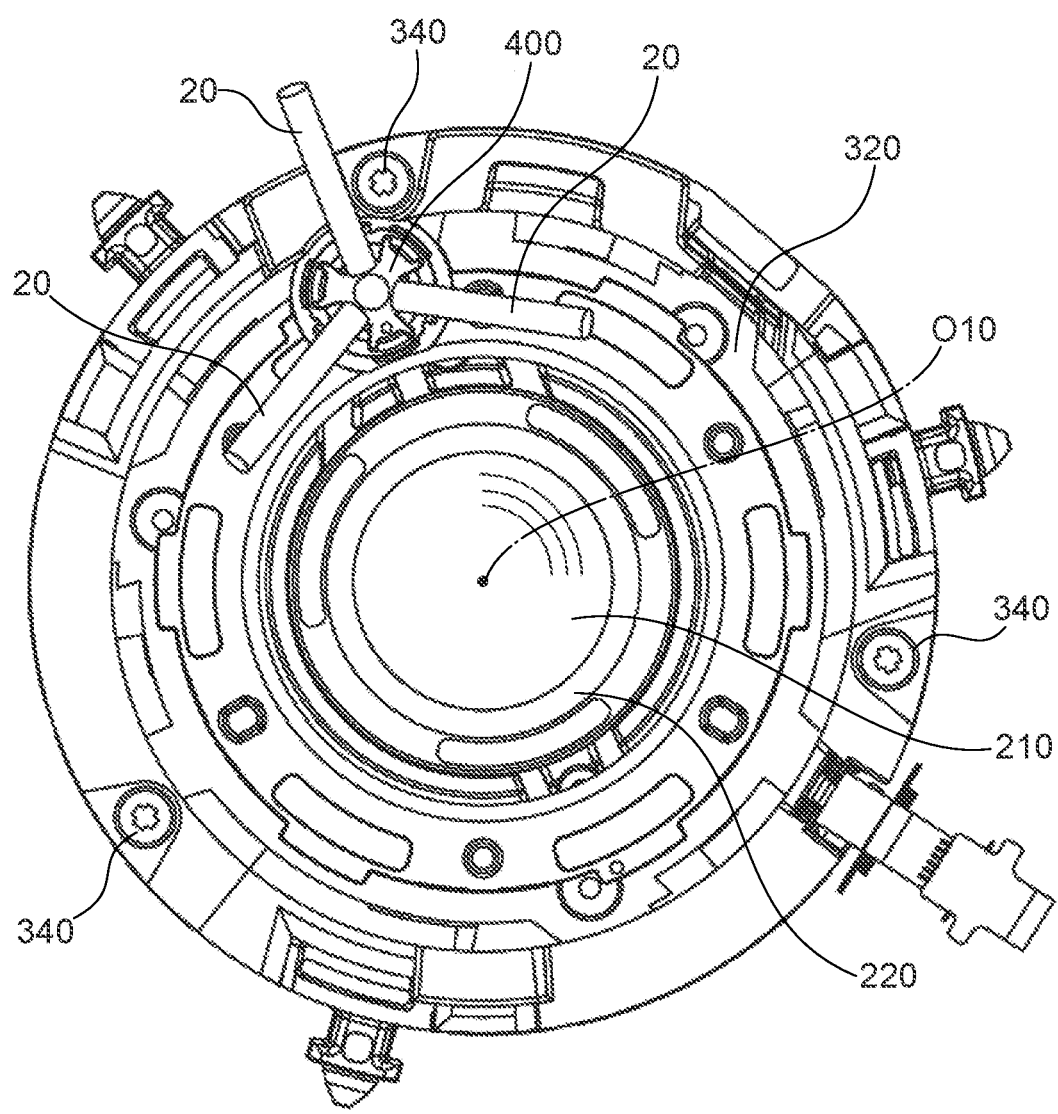
FIG. 7 is a plan diagram showing an adjustment of the bearing (a tilt adjustment of a focus group) by a jig viewed from the image side.
Figure 8:
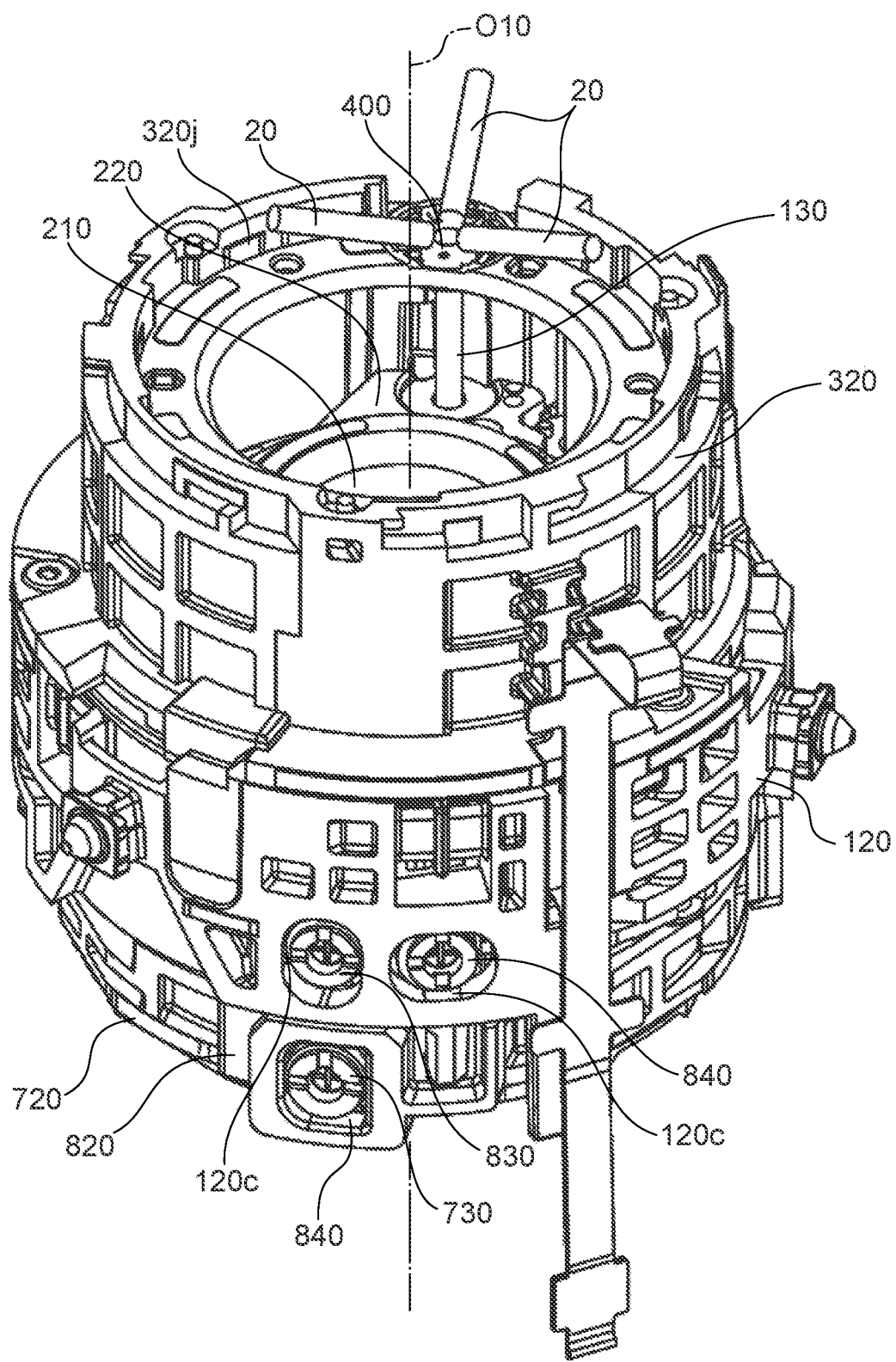
FIG. 8 is a perspective diagram showing the adjustment of the bearing (the tilt adjustment of the focus group) by the jig viewed from the image side.

FIG. 5A is a diagram showing an assembly phase of the bearing 400. FIG. 5B is a diagram showing an assembly phase (first position) of the bearing 400, at which no adjustment of the focus group 200 is made. FIG. 5C is a diagram showing an assembly phase (second position) of the bearing 400, at which a tilt adjustment of the focus group 200 is made. FIGS. 6A and 6B are longitudinal sectional diagrams showing a state in which the bearing 400 is embedded in the second fixed lens frame 320. FIG. 6A is a longitudinal sectional diagram showing a state in which the bearing 400 and the second fixed lens frame 320 are engaged with each other at the first position shown in FIG. 5B. FIG. 6B is a longitudinal sectional diagram showing a state in which the bearing 400 and the second fixed lens frame 320 are engaged with each other at the second position shown in FIG. 5C. FIG. 7 is a plan diagram showing an adjustment of the bearing 400 (a tilt adjustment of the focus group) by a jig 20 viewed from the image side. FIG. 8 is a perspective diagram showing the adjustment of the bearing 400 (the tilt adjustment of the focus group) by the jig 20 viewed from the image side.

In the state shown in FIG. 5A, the bearing 400 is inserted into the opening 320a of the second fixed lens frame 320. Accordingly, the abutting surfaces 320c of the second fixed lens frame 320 and the abutting surfaces 400e of the bearing 400 abut on each other. Along with the insertion of the bearing 400 into the opening 320a of the second fixed lens frame 320, the other end of the main guide bar 130 on the image side is inserted into the retainer 400c of the bearing 400. The bearing 400 is retained by the second fixed lens frame 320, so as to be rotatable in both an arrow α direction and an arrow β direction (FIGS. 5B and 5C).

When the bearing 400 is rotated in the arrow α direction in the assembly phase shown in FIG. 5A, the state shifts to a state shown in FIGS. 5B and 6A. FIGS. 5B and 6A show a state in which the bearing 400 rotated relative to the second fixed lens frame 320 and moved to the first position. When the bearing 400 is located at the first position, the fitting surfaces 400d of the bearing 400 are interlocked with the fitting surfaces 320e of the second fixed lens frame 320. The restricting surfaces 400h of the bearing 400 abut on the restricting surfaces 320i of the second fixed lens frame 320. Accordingly, the motion of the bearing 400 in the perpendicular direction is restricted. In addition, the adhesion indentations 400f of the bearing 400 and the first adhesion portions 320f of the second fixed lens frame 320 get in the same phase, thereby shifting to a state in which the bearing 400 and the second fixed lens frame 320 can be adhered to each other. In this state, a predetermined adhesive is applied to the adhesion indentations 400f, the first adhesion portions 320f, and the neighboring parts thereof, whereby the bearing 400 is fixed to the second fixed lens frame 320.

On the other hand, when the bearing 400 is rotated in the arrow β direction in the state shown in FIG. 5A, the state shifts to a state shown in FIGS. 5C and 6B. FIGS. 5C and 6B show a state in which the bearing 400 rotated relative to the second fixed lens frame 320 and moved to the second position. When the bearing 400 is located at the second position, the fitting surfaces 400d of the bearing 400 face the inner walls 320h of the second fixed lens frame 320. In addition, the adhesion indentations 400f of the bearing 400 and the second adhesion portions 320g of the second fixed lens frame 320 get in the same phase, thereby shifting to a state in which the bearing 400 and the second fixed lens frame 320 can be adhered to each other. In this state, a predetermined adhesive is applied to the adhesion indentations 400f, the second adhesion portions 320g, and the neighboring parts thereof, whereby the bearing 400 is fixed to the second fixed lens frame 320.

In a case where the bearing 400 is located at the second position, the abutting surfaces 400e of the bearing 400 abut on the abutting surfaces 320c of the second fixed lens frame 320. In the second fixed lens frame 320, the inner walls 320h are larger in diameter than the fitting surfaces 320e, and a gap 50 is therefore formed between each fitting surface 400d and each inner wall 320h (see FIG. 5C). The restricting surfaces 400h of the bearing 400 are not in positions facing the restricting surfaces 320i of the second fixed lens frame 320, and a gap 60 is formed on the image side of each restricting surface 400h (see FIG. 6B).

In this manner, while the bearing 400 is retained by the second fixed lens frame 320 at the second position, the bearing 400 is movable in the perpendicular direction with only the abutting surfaces 400e abutting on the abutting surfaces 320c of the second fixed lens frame 320. In this state, moving the bearing 400 using the jig 20 to arbitrary position in the perpendicular direction (see FIGS. 7 and 8) causes the main guide bar 130 retained by the bearing 400 to be tilted. Accordingly, it is possible to tilt the focus group 200, thereby enabling the tilt adjustment of the focus group 200.

Rotating the bearing 400 in the arrow α direction fixes the bearing 400 to the second fixed lens frame 320. In this state, the tilt of the focus group 200 is measured. In a case where it is determined that the tilt of the focus group 200 conforms to a predetermined specification as a result of the tilt measurement of the focus group 200, a predetermined adhesive is applied to the adhesion indentations 400f and the first adhesion portions 320f. Accordingly, the bearing 400 can be fixed without adjusting a tilt of the focus group 200.

On the other hand, in a case where it is determined that the tilt of the focus group 200 does not conform to the predetermined specification as a result of the tilt measurement of the focus group 200, rotating the bearing 400 in the arrow β direction moves the bearing 400 to the second position so as to adjust the tilt by the jig 20. Then, the predetermined adhesive is applied to the adhesion indentations 400f and the second adhesion portions 320g, and the bearing 400 is fixed to the second fixed lens frame 320. In this manner, the tilt adjustment of the focus group 200 has to be made only in a case where the bearing 400 cannot be fixed at the first position. Accordingly, in a case where the tilt adjustment of the focus group 200 is unnecessary, the tilt adjustment of the focus group 200 can be omitted, which enhances the productivity of the lens barrel 10.

In a case where the bearing 400 is at the second position, the protrusions 400b and the cutouts 320d are disposed in such a manner that the abutting surfaces 320c do not face the optical axis O10. With this configuration, as shown in FIG. 7, the jig 20 does not overlap the optical axis O10 during the tilt adjustment of the focus group 200. Therefore, the tilt adjustment can be made with ease.

As to the bearing 400, the diameter of each fitting surface 400d is denoted by "R_400d", and the diameter of the outer peripheral portion 400i of the main body 400j is denoted by "R_400i". As to the second fixed lens frame 320, the diameter of each inner wall 320h is denoted by "r_320h", and the diameter of each inner peripheral wall 320j is denoted by "r_320j". In this case, the relational expression of (R_400d−r_320h)<(r_320j−R_400i) is valid. Accordingly, when the bearing 400 is moved in the perpendicular direction, the fitting surfaces 400d of the bearing 400 serve as restricting surfaces that restrict the motion of the bearing 400 and come into contact with the inner walls 320h of the second fixed lens frame 320. In other words, the fitting surfaces 400d and the inner walls 320h are closest to each other in the perpendicular direction in a state where the tilt adjustment is possible. As described above, the adhesion indentations 400f are disposed in the image side of the fitting surfaces 400d. Furthermore, the second adhesion portions 320g are in the same phase as the inner peripheral walls 320j. For this reason, when the bearing 400 is rotated in the arrow β direction to make the tilt adjustment, the adhesion indentations 400f and the second adhesion portions 320g come closest to each other, whereby the adhesive is applied efficiently.

Next, the positioning unit 30 that positions the second fixed lens 310 will be described. As described above, the second fixed lens 310 has the three projections 310b which protrude from the flange 310j and constitute the positioning unit 30 (see FIG. 2). The three projections 310b are arranged at regular intervals along the circumferential direction of the flange 310j, that is, at equiangular intervals around the optical axis O10. Each of the projections 310b has a dimension in which the projections 310b is formable in the flange 310j and has a cylindrical shape (circular column shape) with an outside diameter constant along the direction of the optical axis O10. Each of the projections 310b is smaller in outside diameter than the second fixed lens 310. Accordingly, it is possible to form the projections 310b with high dimensional accuracy.

Figure 9:
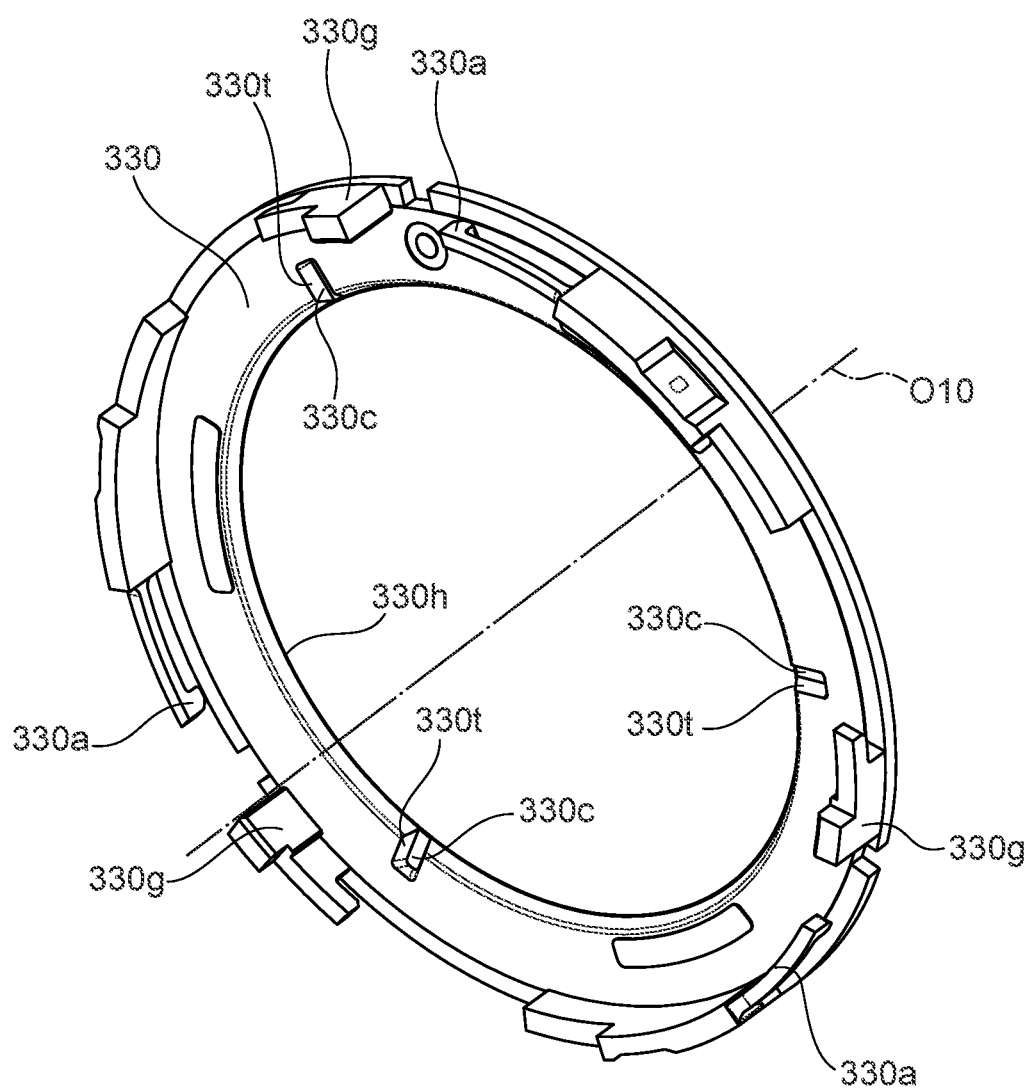
FIG. 9 is a perspective diagram of a cover included in the lens barrel shown in FIG. 1.

FIG. 9 is a perspective diagram of the cover 330 included in the lens barrel shown in FIG. 1. As shown in FIG. 9, the cover 330 has three recesses 330c disposed in the same side in the cover 330 as a side on which the arms 330a and the fitting portions 330g are disposed. In the configuration shown in FIG. 9, the three recesses 330c are arranged at regular intervals along the circumferential direction of the cover 330, that is, at equiangular intervals around the optical axis O10. In the present embodiment, each recess 330c is formed as an indentation extending along the radial direction (radially) centering on the optical axis O10. These recesses 330c constitute the positioning unit 30 similarly to the projections 310b of the second fixed lens 310. The placement number of the recesses 330c is the same as the placement number of the projections 310b. One recess 330c is provided so as to open toward one projection 310b, and each projection 310b is inserted into the corresponding recess 330c. It should be noted that the placement number of the recesses 330c is not limited to three as long as it is the same as the placement number of the projections 310b.

Figure 10A:
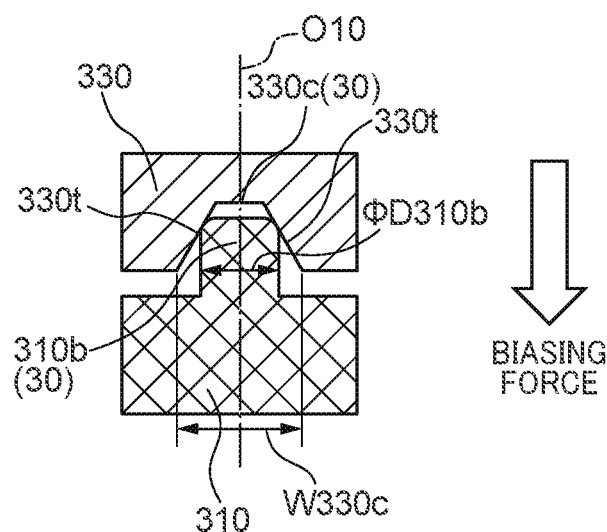
FIGS. 10A and 10B are longitudinal sectional diagrams taken along the direction of the optical axis, showing a state in which a projection is inserted into a recess.
Figure 10B:
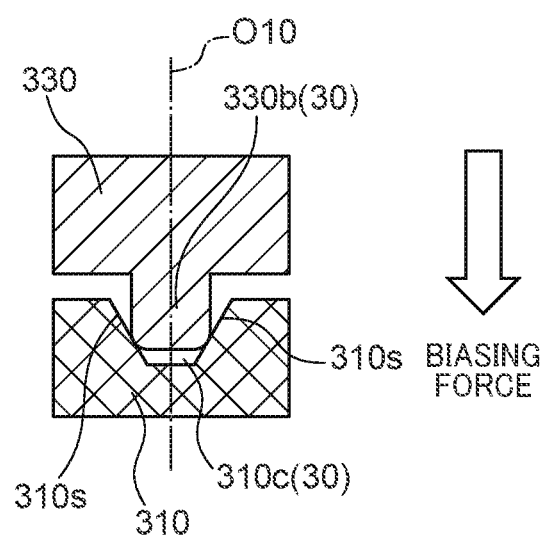

FIGS. 10A and 10B are longitudinal sectional diagrams taken along the direction of the optical axis, showing a state in which one projection is inserted into one recess. FIG. 10A is a longitudinal sectional diagram for the present embodiment. FIG. 10B is a longitudinal sectional diagram for a variation of the present embodiment. As shown in FIG. 10A, each recess 330c of the cover 330 has a pair of tapered surfaces 330t between which a width of the indentation gradually increases toward each projection 310b of the second fixed lens. In other words, each side surface of the recess 330c is a tilted surface that is tilted relative to the direction of the optical axis O10. A maximum width W330c between the tapered surfaces 330t of each recess 330c is larger than an outside diameter (maximum outside diameter) φD310b of each projection 310b. Accordingly, when the projection 310b is inserted into the recess 330c, the tapered surfaces 330t come into contact with the top of the projection 310b. The contact is a point contact.

For the cover 330, the fitting portions 330g are interlocked with the outer peripheral portion of the second fixed lens frame 320. With this configuration, the cover 330 is positioned in the perpendicular direction relative to the second fixed lens frame 320. For the second fixed lens 310, the flange 310j is separated from the inner peripheral walls 320j of the second fixed lens frame 320. In assembling the cover 330, the second fixed lens 310, and the second fixed lens frame 320, the projections 310b are inserted into the recesses 330c, and the projections 310b and the tapered surfaces 330t of the recesses 330c make point contact with each other. At this state, the second fixed lens 310 is being biased in the direction of the optical axis O10 by biasing forces of arms 330a of the cover 330. With the synergistic effect of the point contact and the biasing, the second fixed lens 310 is more accurately positioned (positionally regulated) in the direction of the optical axis O10. As described above, the cover 330 is positioned in the perpendicular direction relative to the second fixed lens frame 320. With this positioning, the second fixed lens 310 is also positioned in the perpendicular direction.

In the above-mentioned manner, out of the positioning of the second fixed lens 310 in the direction of the optical axis O10 and the positioning of the second fixed lens 310 in the perpendicular direction, the positioning unit 30 enables at least the positioning in the direction of the optical axis O10. Accordingly, the lens barrel 10 has good optical performance. As described above, the three projections 310b and the three recesses 330c are arranged at equiangular intervals around the optical axis O10. With this configuration, the second fixed lens 310 is stably positioned. It should be noted that although the tapered surfaces 330t are disposed in pairs in the present embodiment, the number of tapered surfaces is not limited and may be one.

The cover 330, the second fixed lens 310, and the second fixed lens frame 320 are assembled in a simple manner in which the projections 310b are inserted into the recesses 330c while components of the cover 330, components of the second fixed lens 310, and components of the second fixed lens frame 320 are overlapping one another in the direction of the optical axis O10. Accordingly, the lens barrel 10 is excellent in assemblability. Furthermore, in this assembly, the second fixed lens 310 is firmly fixed to the second fixed lens frame 320 without using an adhesive or the like. Even when the bearing 400 requires readjustment afterward, the second fixed lens 310 is easily removed, and therefore readjustment of the bearing 400 can be easily performed. In addition, for example, even if there is deviation in the positioning accuracy between the projections 310b and the tapered surfaces 330t, the deviation can be compensated by the elasticity of the arms 330a and/or the indentation shape of the recesses 330c. The cover 330 is formed by a cylindrical or ring-shaped member as described above, wherein the cover 330 has a central part having a circular opening 330h that penetrates the cover 330 in the direction of the optical axis O10. The amount of light passing through the second fixed lens 310 can be limited by the opening 330h.

As shown in FIG. 10B, in the variation of the present embodiment, a positioning unit 30 is constituted by recesses 310c provided in a second fixed lens 310 and projections 330b provided in a cover 330. The recess 310c has a pair of tapered surfaces 310s and comes in contact with the top of the projection 330b by the tapered surfaces 310s. Accordingly, similarly to the configuration shown in FIG. 10A, the lens barrel 10 has excellent assemblability in the assembly of the cover 330, the second fixed lens 310, and the second fixed lens frame 320, and has good optical performance.

Figure 11A:
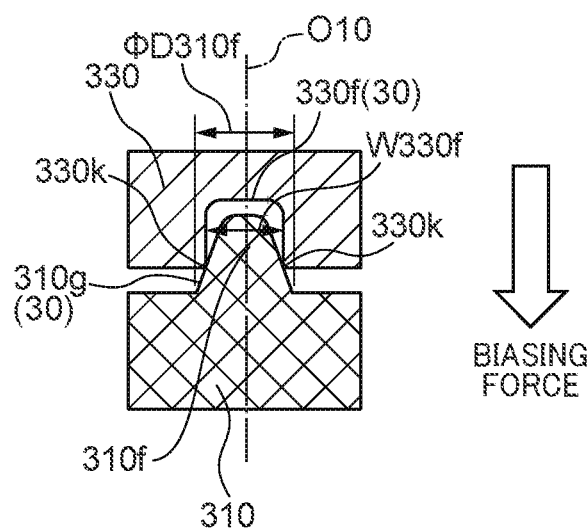
FIGS. 11A and 11B are longitudinal sectional diagrams taken along a direction of an optical axis of a lens barrel according to a second embodiment of the present invention, showing a state in which a projection is inserted into a recess.
Figure 11B:
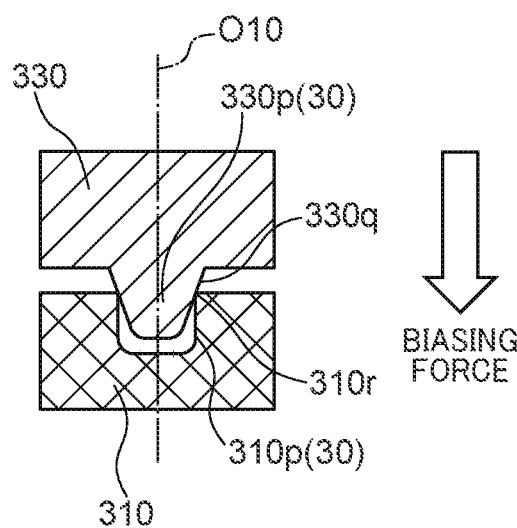

Hereinafter, a second embodiment will be described with reference to FIGS. 11A and 11B, wherein differences from the first embodiment will be mainly described, and details similar to those of the first embodiment will be omitted. FIGS. 11A and 11B are longitudinal sectional diagrams taken along a direction of an optical axis of a lens barrel 10 according to the second embodiment of the present invention, showing a state in which a projection is inserted into a recess. FIG. 11A is a longitudinal sectional diagram for the present embodiment. FIG. 11B is a longitudinal sectional diagram for a variation of the present embodiment.

As shown in FIG. 11A, a positioning unit 30 is constituted by projections 310f provided in a second fixed lens 310 and recesses 330f provided in a cover 330. The projection 310f has a tapered surface 310g having an outside diameter gradually decreasing toward the recess 330f. In other words, an outer peripheral surface of the projection 310f is a tilted surface that is tilted relative to a direction of an optical axis O10. The recess 330f is an indentation having a width W330f constant along the direction of the optical axis O10. The tapered surface 310g of the projection 310f has a maximum outside diameter φD310f larger than a width W330f (maximum width of the recess 330f). With this configuration, when the projection 310f is inserted into the recess 330f, a part on the tapered surface 310g makes point contact with an edge (open portion) 330k of the recess 330f.

As shown in FIG. 11B, in the variation of the present embodiment, a positioning unit 30 is constituted by a recess 310p formed as an indentation provided in a second fixed lens 310 and a projection 330p provided in a cover 330. The projection 330p has a tapered surface 330q having an outside diameter gradually decreasing toward the recess 310p. In other words, an outer peripheral surface of the projection 330p is a tilted surface that is tilted relative to the direction of the optical axis O10. When the projection 330p is inserted into the recess 310p, a part on the tapered surface 330q makes point contact with an edge 310r of the recess 310p.

With the positioning unit 30 having the configuration shown in FIG. 11A or 11B, similarly to the first embodiment, the lens barrel 10 according to the second embodiment has excellent assemblability in the assembly of the cover 330, the second fixed lens 310, and the second fixed lens frame 320, and has good optical performance.

As described above, the positioning unit 30 has at least one projection disposed in one of the flange 310j and the cover 330 of the second fixed lens 310, and at least one recess disposed in the other of the flange 310j and the cover 330. At least one of the projection and the recess has a tilted surface and comes into contact with the other by the tilted surface. In the present embodiment, the contact on the tilted surface is a point contact but is not limited thereto. For example, the contact between a projection and a recess on a tilted surface may be a line contact depending on the shape of the projection and/or the recess.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120683, filed Jul. 28, 2022, which is hereby incorporated by reference wherein in its entirety.

What is claimed is:

1. A lens barrel comprising:
an optical lens including a lens unit configured to function as a lens and a flange disposed in an outer peripheral portion of the lens unit and having an enlarged outside diameter;
a retaining member configured to retain the optical lens on one side of the lens unit in a direction of an optical axis;
a pressing member which is positioned and fixed by the retaining member at a position in a perpendicular direction perpendicular to the direction of the optical axis, the pressing member being configured to bias and press the optical lens toward one side in the direction of the optical axis with respect to the retaining member; and
a positioning unit configured to position the optical lens relative to the pressing member,
wherein the positioning unit comprises:
at least one projection, which is disposed in one of the flange and the pressing member, and each of which protrudes in the direction of the optical axis; and
at least one recess, which is disposed in the other of the flange and the pressing member, and each of which is opened toward the projection, and into which the projection is inserted, and
wherein at least one of the projection and the recess has a tilted surface tilted relative to the direction of the optical axis and comes in contact with the other of the projection and the recess by the tilted surface.

2. The lens barrel according to claim 1, wherein the positioning unit is configured to make, out of the positioning of the optical lens in the direction of the optical axis and positioning of the optical lens in the perpendicular direction, at least positioning of the optical lens in the direction of the optical axis.

3. The lens barrel according to claim 1, wherein the contact on the tilted surface is a point contact or line contact.

4. The lens barrel according to claim 1, wherein the recess is formed as an indentation extending along a radial direction centering on the optical axis.

5. The lens barrel according to claim 4, wherein the recess has tapered surfaces between which a width of the indentation gradually increases toward the projection, wherein each of the tapered surface of the recess serves as the tilted surface.

6. The lens barrel according to claim 5, wherein
the projection has a cylindrical shape, and
a maximum width between the tapered surfaces of the recess is larger than a maximum outside diameter of the projection.

7. The lens barrel according to claim 1, wherein the projection has a cylindrical shape.

8. The lens barrel according to claim 7, wherein the projection has a tapered surface having an outside diameter gradually decreasing toward the recess, wherein the tapered surface of the projection serves as the tilted surface.

9. The lens barrel according to claim 8, wherein
the recess is formed as an indentation extending along a radial direction centering on the optical axis, and
a maximum outside diameter of the tapered surface of the projection is larger than a maximum width of the indentation.

10. The lens barrel according to claim 1, wherein each of a placement number of the projections and a placement number of the recesses is three or more.

11. The lens barrel according to claim 10, wherein the three or more projections and the three or more recesses are arranged at equiangular intervals around the optical axis respectively.

12. The lens barrel according to claim 1, wherein the lens is arranged so that the flange of the optical lens is separated from the retaining member.

13. The lens barrel according to claim 1, wherein the pressing member includes a biasing portion configured to bias the optical lens toward one side in the direction of the optical axis with respect to the retaining member, and the pressing member is connected to the retaining member via the biasing portion.

14. The lens barrel according to claim 1, wherein the pressing member has an opening penetrating the pressing member in the direction of the optical axis and opened in a circular shape.

15. The lens barrel according to claim 1, wherein each of the retaining member and the pressing member is a cylindrical or ring-shaped member.

16. An image pickup apparatus comprising a lens barrel, the lens barrel comprising:
an optical lens including a lens unit configured to function as a lens and a flange disposed in an outer peripheral portion of the lens unit and having an enlarged outside diameter;
a retaining member configured to retain the optical lens on one side of the lens unit in a direction of an optical axis;
a pressing member which is positioned and fixed by the retaining member at a position in a perpendicular direction perpendicular to the direction of the optical axis, the pressing member being configured to bias and press the optical lens toward one side in the direction of the optical axis with respect to the retaining member; and
a positioning unit configured to position the optical lens relative to the pressing member,
wherein the positioning unit comprises:
at least one projection which is disposed in one of the flange and the pressing member, and each of which protrudes in the direction of the optical axis; and
at least one recess which is disposed in the other of the flange and the pressing member, and each of which is opened toward the projection and into which the projection is inserted, and
wherein at least one of the projection and the recess has a tilted surface tilted relative to the direction of the optical axis and comes in contact with the other of the projection and the recess by the tilted surface.

17. A method for positioning an optical lens in a lens barrel,
wherein the lens barrel comprises:
an optical lens including a lens unit configured to function as a lens and a flange disposed in an outer peripheral portion of the lens unit and having an enlarged outside diameter;
a retaining member configured to retain the optical lens on one side of the lens unit in a direction of an optical axis; and
a pressing member which is positioned and fixed by the retaining member at a position in a perpendicular direction perpendicular to the direction of the optical axis, the pressing member being configured to bias and press the optical lens toward one side in the direction of the optical axis with respect to the retaining member,
the method for positioning the optical lens comprising:
providing at least one projection, which is disposed in one of the flange and the pressing member, and each of which protrudes in the direction of the optical axis, and at least one recess, which is disposed in the other of the flange and the pressing member, and each of which is opened toward the projection, and into which the projection is inserted; and
providing at least one of the projection and the recess with a tilted surface tilted relative to the direction of the optical axis, and bringing the other of the projection and the recess into contact with the tilted surface.

* * * * *